C. H. SATTERLEE.
BRAKE.
APPLICATION FILED SEPT. 29, 1919.

1,342,352.

Patented June 1, 1920.

Witnesses
R. A. Thomas

Inventor
C. H. Satterlee
By Victor J. Evans
Attorney

UNITED STATES PATENT OFFICE.

CHARLES H. SATTERLEE, OF DANVILLE, ILLINOIS.

BRAKE.

1,342,352.	Specification of Letters Patent.	Patented June 1, 1920.

Application filed September 29, 1919. Serial No. 327,075.

*To all whom it may concern:*

Be it known that I, CHARLES H. SATTERLEE, a citizen of the United States, residing at Danville, in the county of Vermilion and State of Illinois, have invented new and useful Improvements in Brakes, of which the following is a specification.

This invention relates to improvements in brakes and the principal object of the invention is to provide an internal automatic safety brake for automobiles and the like for preventing the same from moving backwardly while the brake is in operative position.

The purpose of the invention is to prevent the automobile from backing down a hill if the engine should become stalled or the regular brakes should refuse to hold, or if the car is stopped on a hill.

Another object of the invention is to provide means for moving the brake into operative position whenever desired by means of a manually operated lever.

The invention also consists in certain other tion and arrangement of the several parts, features of construction and in the combinato be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figures 1, 2, 3:
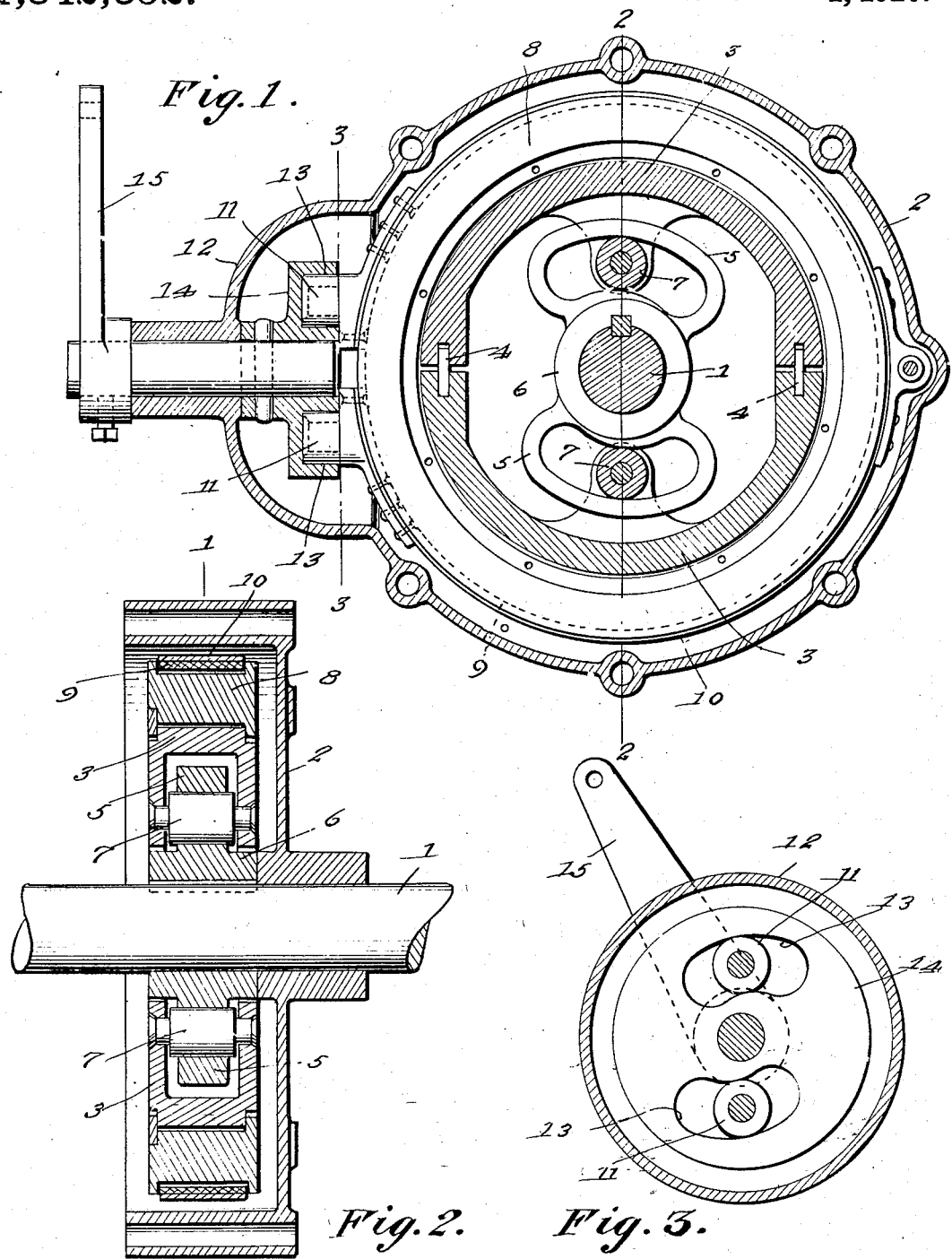
Figure 1 is a sectional view through the invention on line 1—1 of Fig. 2.
Fig. 2 is a section on line 2—2 of Fig. 1.
Fig. 3 is a section on line 3—3 of Fig. 1.

The invention is shown in use on an automobile but it will be understood that it may be applied to shafts of other machinery where it is desired to prevent rotation in a reverse direction.

In these views 1 indicates the jack or drive shaft of an automobile. A casing 2 is placed around a part of this shaft and may be suitably connected with the regular housing of the shaft. I prefer to place this device just behind the universal joint. A pair of brake shoes 3 are placed around the shaft 1 within the housing and these shoes are movably held together by the blocks 4 which engage recesses formed in the contacting edges of the shoes. These shoes are of substantially channel shape in cross section, as shown in Fig. 2, and the cam members 5 extend within said channels. These channel members are connected together by a sleeve 6 which is keyed to the shaft 1. The channel members are each provided with a curved slot so arranged as to form a cam at one end thereof. Rollers 7 pass through said slots and the ends of said rollers are journaled in the brake shoes.

A brake ring 8 surrounds the brake shoes and a brake lining 9 engages said ring. The brake band 10 surrounds said lining and the ends of said band carry the rollers 11 which project into an offset part 12 of the casing 2. These rollers engage the cam slots 13 formed in the cam member 14 and said member is actuated by a lever 15 which is arranged in a position where it may be seized by the driver.

It will thus be seen that when said lever 15 is moved in a position to cause the brake member 14 to bring the ends of the brake band together, said band will grip the ring so that when the brake shoes are forced outwardly by the action of the cam members thereon, a braking action will take place upon the shaft 1. It will be seen that as long as the shaft 1 is rotated in one direction the brake shoes will not be acted upon even though the lever 15 is in braking position. When the shaft 1 is rotated in the other direction, however, the rollers 7 will ride up on the cam parts of the slots and thus the brake shoes will be forced outwardly against the brake ring and thus a braking action will be set up.

By this means an automobile may be driven forwardly as usual but if the engine should stop for any reason and the car should start to go backward the brake would take hold and thus stop the car. By my invention the automobile may be left on a hill without danger of the car running down the hill and in traveling over mountainous country my braking device may be used to prevent rearward movement of the car and thus save the regular brakes.

When it is desired to back the automobile the lever 15 is moved to release the brake band 10. This will permit the automobile to back as the shoes will then grip the ring 8 but said ring will be free to rotate as the lining 9 carried by the brake band 10 will be out of engagement therewith. Thus the car may be backed in the usual manner.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. The combination with a driven shaft, of cam means connected therewith, brake shoes of channel form surrounding said cam means, rollers carried by said shoes and engaging said cam means, a brake ring surrounding said shoes, a brake band surrounding said ring and means for actuating the band.

2. The combination with a driven shaft, of cam members connected therewith, brake shoes expanded by said members on the reverse rotation of the shaft, a brake band coöperating with the shoes, rollers connected with the ends of said band, a cam member having slots therein with which the rollers engage and a lever for actuating said member.

In testimony whereof I affix my signature.

CHARLES H. SATTERLEE.